Figure 1:
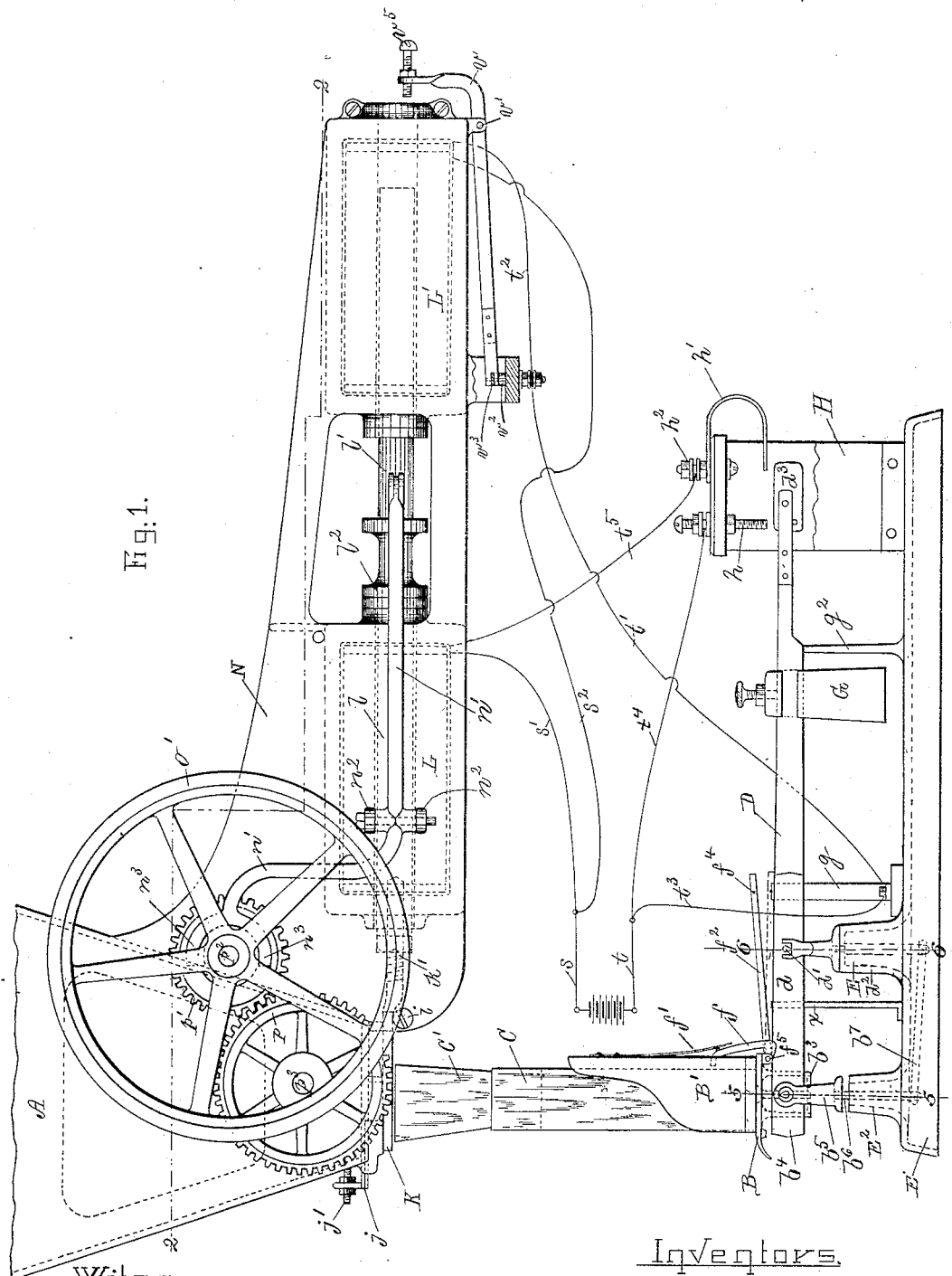

(No Model.) 4 Sheets—Sheet 1.

W. H. DOBLE & E. H. DEWSON, Jr.
AUTOMATIC WEIGHING AND PACKAGE FILLING MACHINE.

No. 532,036. Patented Jan. 8, 1895.

Witnesses.
Lauritz N. Möller
Mary C. Möller

Inventors.
William H. Doble
Edward H. Dewson, Jr.
by W. A. Copeland
their atty.

(No Model.) 4 Sheets—Sheet 2.
W. H. DOBLE & E. H. DEWSON, Jr.
AUTOMATIC WEIGHING AND PACKAGE FILLING MACHINE.
No. 532,036. Patented Jan. 8, 1895.
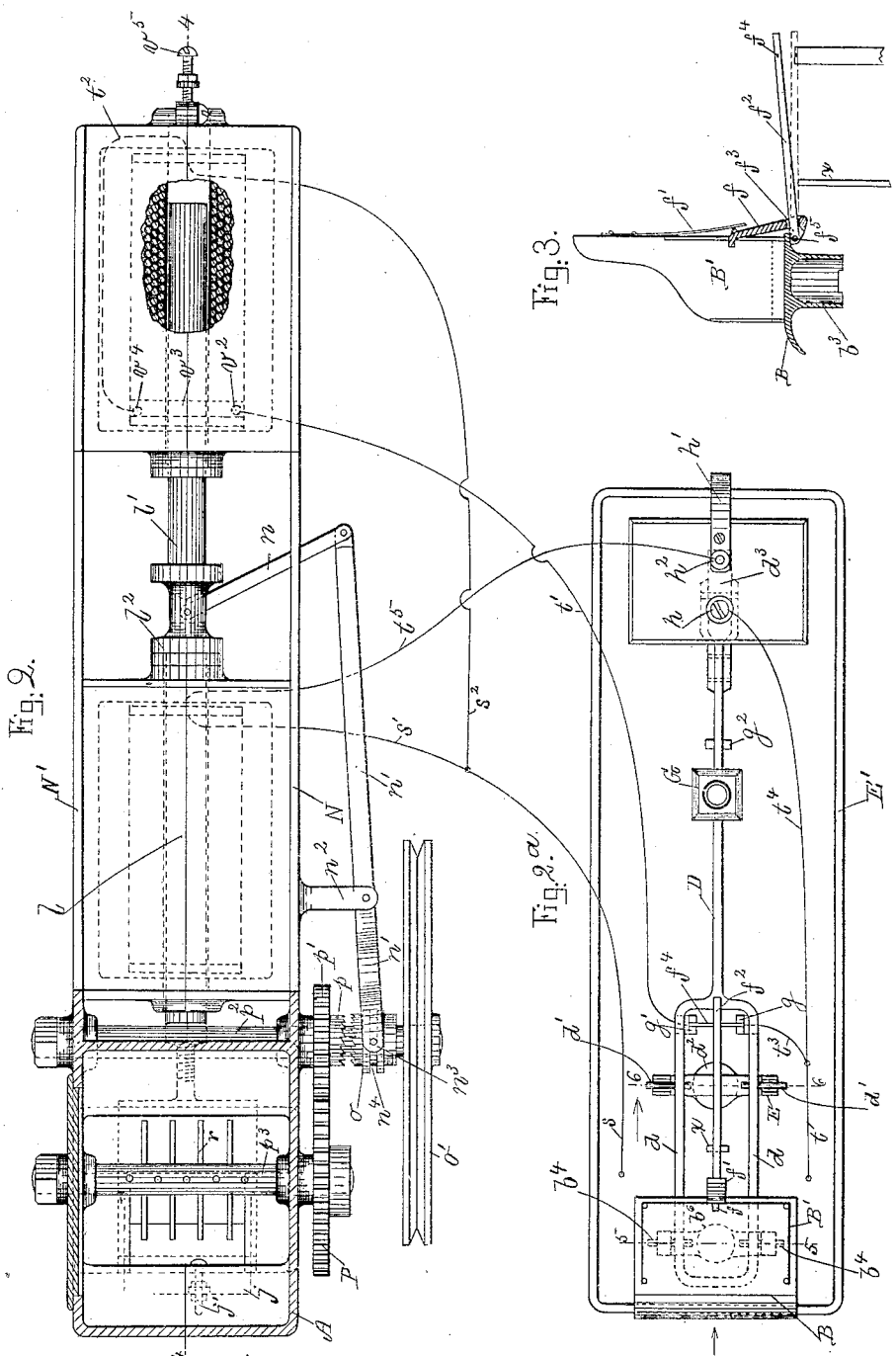
Witnesses.
Lauritz W. Möller
Mary L. Möller
Inventors.
William H. Doble
Edward H. Dewson, Jr
by W. A. Copeland
their atty.

(No Model.) 4 Sheets—Sheet 3.
W. H. DOBLE & E. H. DEWSON, Jr.
AUTOMATIC WEIGHING AND PACKAGE FILLING MACHINE.
No. 532,036. Patented Jan. 8, 1895.
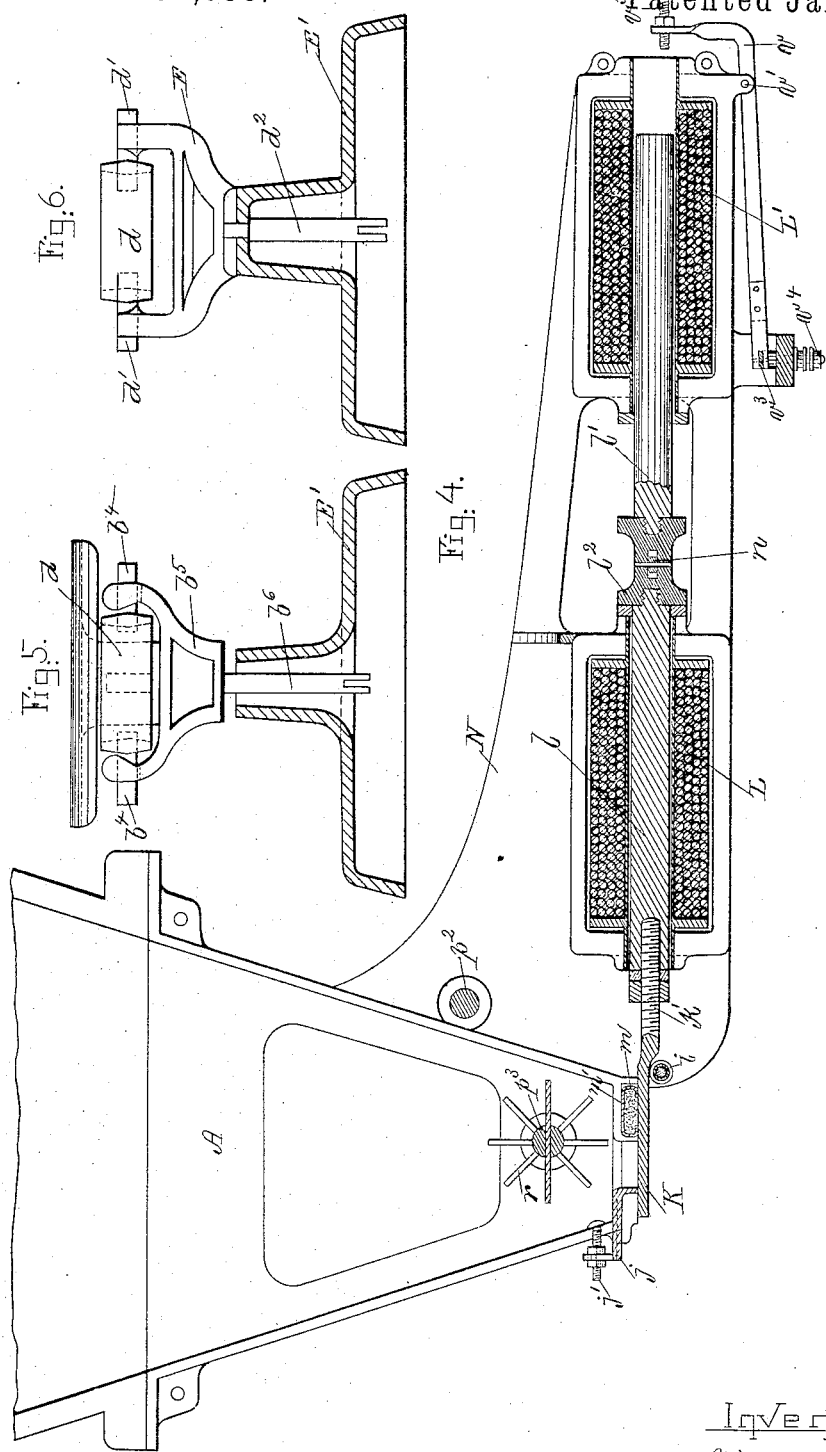
Witnesses
Lauritz N. Möller
Mary C. Möller
Inventors.
William H. Doble.
Edward H. Dewson, Jr.
by W. A. Copeland
their atty.

(No Model.) 4 Sheets—Sheet 4.
W. H. DOBLE & E. H. DEWSON, Jr.
AUTOMATIC WEIGHING AND PACKAGE FILLING MACHINE.
No. 532,036. Patented Jan. 8, 1895.
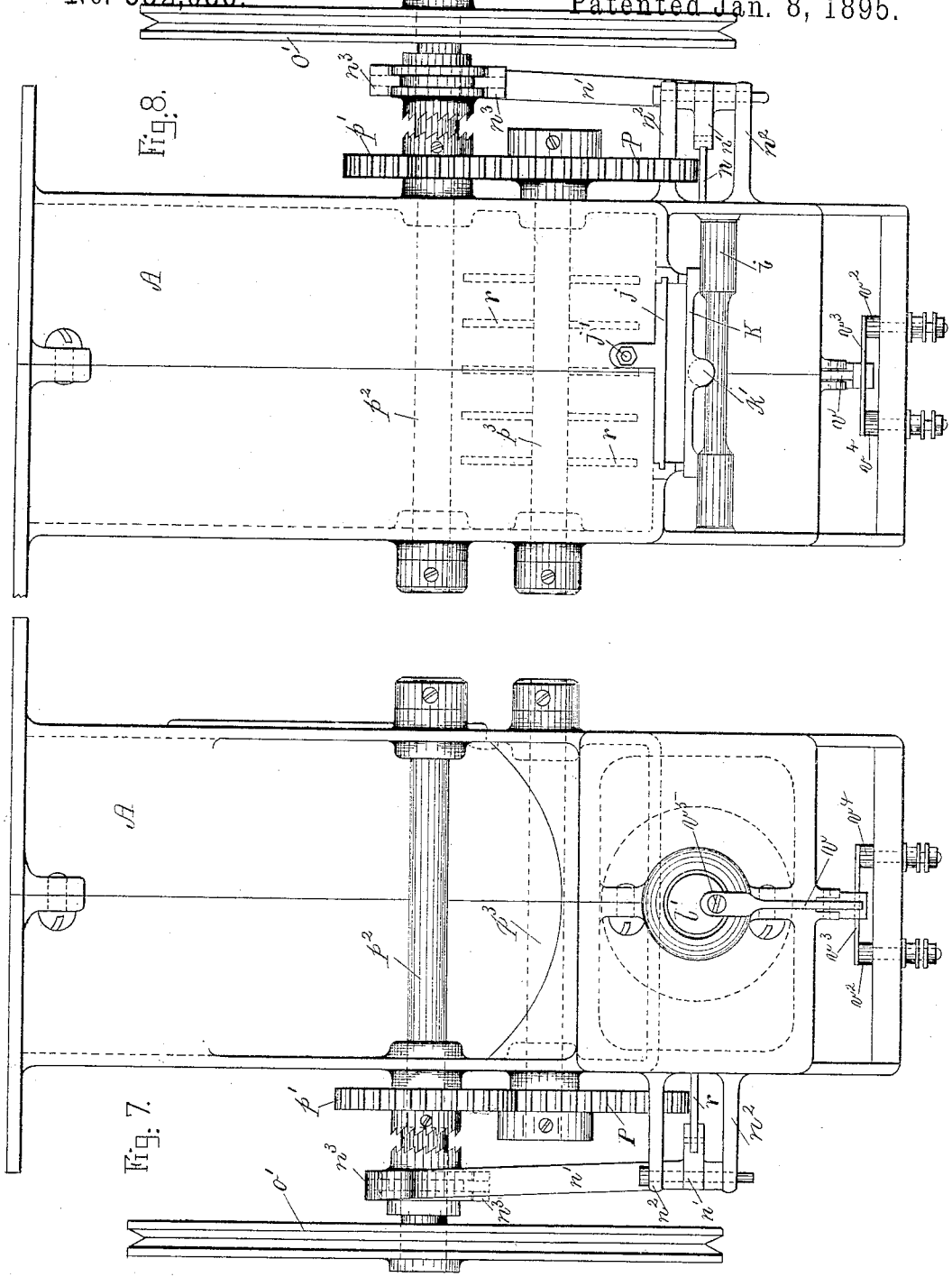
Witnesses
Lauritz W. Möller
Mary C. Möller
Inventors.
William H. Doble
Edward H. Dewson, Jr.
by W. A. Copeland
their atty.

UNITED STATES PATENT OFFICE.

WILLIAM H. DOBLE AND EDWARD H. DEWSON, JR., OF QUINCY, MASSACHUSETTS, ASSIGNORS TO THE PURITY DRIED FRUIT CLEANSING COMPANY, OF SAME PLACE.

AUTOMATIC WEIGHING AND PACKAGE-FILLING MACHINE.

SPECIFICATION forming part of Letters Patent No. 532,036, dated January 8, 1895.

Application filed March 12, 1894. Serial No. 503,225. (No model.)

*To all whom it may concern:*

Be it known that we, WILLIAM H. DOBLE and EDWARD H. DEWSON, Jr., citizens of the United States, residing at Quincy, in the county of Norfolk and Commonwealth of Massachusetts, have invented a new and useful Improvement in Automatic Weighing and Package-Filling Machines, of which the following is a specification, reference being had to the accompanying drawings.

Our invention relates to a machine for weighing package goods, and has more particular reference to the feed and automatic cut off.

Our invention consists in an electrically operated automatic cut off whereby the supply of goods from the feeder may be shut off as soon as a predetermined quantity has been fed to the receptacle on the scales, and in a feeding device which is automatically thrown out of gear at the same time the feed is cut off, as will be more particularly described and claimed. It is especially adapted for use in putting up dried currants and other sticky goods, but may be used equally well with dry goods.

In the drawings, Figure 1 is a side elevation of a machine embodying our invention. Figs. 2 and $2^a$ are plan views partly in section with the connecting wires shown in diagram. The parts shown in Fig. $2^a$ are, in the machine, directly underneath the parts shown in Fig. 2, but are in the drawings shown at one side for clearness. Fig. 3 is a detail view of the package holder. Fig. 4 is a longitudinal section on line 4 4 of Fig. 2. Fig. 5 is a rear end view of the scale portion, partly in section, on line 5 5 of Figs. 1 and 2, the box holder B' on the scale pan being removed. Fig. 6 is a rear view of the scale beam (all dependent parts being removed), the scale beam support, and a section of the base on line 6 6 of Figs. 1 and 2. Fig. 7 is a rear end view on an enlarged scale, and Fig. 8 is a front end view on an enlarged scale.

A represents the feed hopper; B, the platform of a set of scales; B', a guard to hold the carton or package C in an upright position, and C' a funnel inserted in the top of the carton to guide the goods from the outlet of the hopper.

The drawings represent the machine as it appears just as an empty carton is being inserted in the holder on the scale, before it is pushed back fully into position, and before the slide which closes the outlet of the hopper has been opened.

E' is the base of the scales. The scale beam D branches forwardly into two arms $d\ d$ which are united again at the end. These arms have knife edge pivots $d'\ d'$ by which the beam is pivoted in the forked standard E mounted on the base E'.

The platform B is formed with a downwardly extending stem $b^3$ fastened to the forked casting $b^5$ which is suspended from the scale beam by the knife edges $b^4$. The bracket casting $b^5$ has a stem $b^6$ pivoted at its lower end to a link $b^7$ which in turn is pivoted to the stem $d^2$ fixed to the standard E, thereby maintaining the platform constantly in a horizontal position as it rises and falls. The upwardly projecting part of the base $E^2$ forms a stop for the scale pan in its downward movement.

A finger $f$ is pivoted to the platform and its upper end projects through an opening in the wall of the guard B' before the carton is pushed back into place, and it is held there by a spring $f'$ as shown in Figs. 1 and 3. The finger is slotted near its lower end, and a rod $f^2$ pivoted on the same pin $f^5$ as the finger $f$ passes through the slot $f^3$ in the finger and stands at a slight inclination as shown, before the carton is inserted. This slot $f^3$ should be large enough to allow a little play to the rod $f^2$. When the carton is inserted, it pushes back the inwardly projecting end of the finger $f$ and the spring $f'$, and the rod $f^2$ drops until an insulated cross stud $f^4$ strikes on the metal contact posts $g\ g'$ as shown in Figs. 1 and 2, making the electrical connection by which the slide gate covering the outlet of the hopper is opened as will be hereinafter described.

G is the weight.

The post $g^2$ serves as a stop for the scale beam in its descent. Pivoted in the insulating forked end of the scale beam is a contact block $d^3$. A platform H has secured to its top the contact terminal $h$ and the spring terminal $h'$ insulated from each other, the spring $h'$ being secured to the table by the binding screw $h^2$. The terminals $h'$ and $h$ are so adjusted that when the scale beam tips, the contact block $d^3$ will come in contact with them.

L L' are two solenoids having shafts or cores $l$ $l'$ whose adjacent ends are screwed into the connecting block $l^2$. A slide gate K which controls the outlet of the hopper has a threaded stem $k'$ which is screwed into the end of the shaft $l$ and reciprocates with the shaft. The size of the outlet of the hopper may be regulated by the adjustable plate $j$ and adjusting screw $j'$. The slide passes over the friction roller $i$ and rubs up against a sponge or wiper $m$ held in the inverted cup $m'$ which should always be kept moist, to clean the gate from any gum that may adhere to it from contact with the currants or other goods being put up. N N' are the sides of the supporting frame, connected with the hopper A. A link $n$ is pivoted to the block $l^2$ and projects through an opening in the side N of the frame. At its outer end it is pivoted to the lever $n'$ which is fulcrumed in the bracket $n^2$. The lever $n'$ has forked ends $n^3$ $n^3$ which have pins sliding in a groove in the clutch O. This clutch is keyed to the driving shaft upon which it is free to move laterally and is adapted to engage with a clutch $p$ on the hub of the small pinion wheel $p'$ mounted on shaft $p^2$. Pinion $p'$ engages with the large pinion P carried on shaft $p^3$. Shaft $p^3$ has a number of radiating pins $r$ which serve as a feeder during the operation of the machine.

The wire $s$ leading from any electric system connects by means of wires $s'$ and $s^2$ with one of the terminals of each solenoid. The wire $t$ connects the other pole of the outside system with the other terminals of the solenoids through connections as hereinafter described. Solenoid L' connects with wire $t$ through wire $t^3$, contact post $g$, cross stud $f^4$, contact post $g'$, wire $t'$, contact post $v^2$, contact bar $v^3$, contact post $v^4$ and wire $t^2$. Solenoid L connects with wire $t$ through wire $t^4$, contact terminal $h$, contact block $d^3$, spring terminal $h'$, binding post $h^2$ and wire $t^5$.

The bent lever $v$ pivoted to the frame N at $v'$ carries in its upper end the adjustable striking point $v^5$, and at its other end an insulated contact bar $v^3$ which is adapted to make connection between the two contacts $v^2$ and $v^4$.

Before the carton is pushed into place so as to thrust back the finger $f$ and drop the rod $f^2$ no current passes through either coil, the slide gate being closed and the clutch disengaged so that the feeder is not in motion. As soon as the carton is pushed into place, the finger $f$ is thrust back, rod $f^2$ drops until the cross stud $f^4$ strikes the posts $g$ $g'$ completing the circuit through the coil L' and the cores $l$ $l'$ are drawn back, opening the slide gate K and allowing the goods to pass down into the carton. The clutch O and pinion $p'$ are brought into engagement through the link $n$ and lever $n'$, and the shaft $p^3$ carrying the feeder is set in rotation.

In completing its backward stroke, the core $l'$ comes in contact with the striking point $v^5$ throwing the same backward and lifting the other end of lever $v$ and contact $v^3$ thereby opening the circuit in solenoid L' at points $v^2$ and $v^4$.

When the carton is filled with the quantity for which the weight G is set, the scale beam will tip; and as the scale platform B begins its downward movement, the rod $f^2$ comes in contact with the fixed end of the post X which then becomes the fulcrum of the rod $f^2$, and the cross stud $f^4$ is lifted from the contacts $g$ $g'$, opening the circuit of solenoid L' at those points.

The post X should not be so high as to prevent cross stud $f^4$ from making contact with posts $g$ $g'$ before the beam begins to tip, but should be high enough to form a fulcrum for the beam and lift the cross stud $f^4$ from contact as soon as the beam does begin to tip. The object of breaking the circuit at this point is that it may not be re-established through the falling of contact bar $v^3$ as core L' moves away from striking point $v^5$ of lever $v$.

Contact block $d^3$ coming into contact with the terminals $h$ and $h'$ completes the circuit through the coil L and causes the core $l$ to be thrust forward to close the gate, throw the clutch out of engagement and to stop the feeder. When the carton is removed from the scales, the spring $f'$ will press the finger $f$ forward again, picking up the rod $f^2$, and the weight G will carry down the scale beam and the contact block $d^3$, breaking the circuit through solenoid L. The gate will remain closed until a new carton is inserted and the circuit re-established through coil L' by the dropping of rod $f^2$ as before.

What we claim as our invention is—

1. In an automatic weighing and package filling machine, the combination with a hopper, a weighing scale and a gate which controls the outlet of the hopper, of a solenoid whose core is connected with the gate and wires leading therefrom, a source of electrical supply, a contact piece connected with the scale beam which when the scale beam tips completes the circuit and the core of the solenoid moves in a direction to close the gate, the circuit being broken by the dropping of the scale beam when the package is removed, and means whereby when a box is again placed on the scales electrical connection is automatically made whereby the core is thrown in the reverse direction and the gate is opened, substantially as described.

2. In an automatic weighing and package filling machine, the combination with a hopper, a weighing scale, and a gate controlling the outlet of the hopper, of a double solenoid having a core connected with the gate, and wires leading therefrom, a source of electrical supply, a contact piece connected with the scale beam which when the scale beam tips completes the circuit and the core of the solenoid moves in a direction to close the gate, the circuit being broken by the dropping of the scale beam when the package is removed, and means whereby when a box is again placed on the scales electrical connection is automatically made whereby the core is thrown in the reverse direction and the gate is opened, substantially as described.

3. In an automatic weighing and package filling machine, the combination with a hopper, a weighing scale, and a gate controlling the outlet of the hopper, of a double solenoid having cores connected with the gate, a contact piece on the scale beam, two terminal pieces adapted to be electrically connected by the contact piece when the scale beam tips, and suitable wires connected with the said terminals and solenoids and a source of electrical supply, whereby the circuit is completed by the tipping of the scale beam and the cores of the solenoids move and close the gate, the circuit being broken by the dropping of the scale beam when the package is removed, and means whereby when a box is again placed on the scales electrical connection is automatically made whereby the cores are thrown in the reverse direction and the gate is opened, substantially as described.

4. In an automatic weighing machine, the combination with a hopper, a weighing scale, and a gate controlling the outlet of the hopper, of a solenoid whose core is connected with the gate, and wires leading therefrom, a spring lever which is within the circuit and adapted to be operated by the placing of a box on the scales whereby the circuit is completed and the core of the solenoid is moved in a direction to open the gate, substantially as described.

5. In an automatic weighing and package filling machine, the combination with a hopper and a weighing scale, of a feeder in the hopper operated by a driving mechanism, a gate which controls the outlet of the hopper, and means whereby when the scale beam tips, the gate will be moved automatically to close the mouth of the hopper and the feeder will be thrown out of engagement with the driving mechanism, substantially as described.

6. In an automatic weighing and package filling machine, the combination with a hopper and a weighing scale, of a gate controlling the outlet of the hopper, a solenoid whose core is connected with the gate, a contact piece on the scale beam, two terminal pieces adapted to be electrically connected by the contact piece when the scale beam tips, and suitable wires connected with the said terminals and solenoid and a source of electrical supply whereby the circuit is completed by the tipping of the scale beam, and the core of the solenoid moves in a direction to close the gate, a feeder in the hopper mounted on a shaft which is geared to the driving mechanism through a clutch, a lever and link connection between the clutch of the driving mechanism and the core of the solenoid whereby when the core is moved in a direction to close the gate the clutch will be disengaged and the feeder will stop, and when the core is moved in the reverse direction and the gate is opened, the clutch will be thrown into engagement, substantially as described.

7. In an automatic weighing and package filling machine the combination with a hopper, a weighing scale and a gate controlling the outlet of the hopper, of a double solenoid having cores connected with the gate, a contact piece on the scale beam, two terminal pieces adapted to be electrically connected by the contact piece when the scale beam tips, and suitable wires connected with said terminals and solenoids and a source of electrical supply whereby the circuit is completed by the tipping of the scale beam, and the cores of the solenoids move in a direction to close the gate, the circuit being broken by the falling of the scale beam when the package is removed, and means whereby when a box is again placed on the scales another electrical circuit is completed whereby the cores are thrown in the reverse direction and the gate is opened, a feeder in the hopper mounted on a shaft which is geared to the driving mechanism through a clutch operated through a lever and link connection by the cores of the solenoids whereby the feeder is thrown into gear with the driving mechanism when the gate is open, and thrown out of gear when the gate is closed, substantially as described.

8. In a weighing and package filling machine, the combination with the platform, of a guard having an upright rear wall, a bent finger pivoted to the rear part of the platform, its upper end projecting through a slot in said wall, a spring fixed to the wall and pressing said finger into the slot, and a lever pivoted to said platform and extending rearwardly through a slot in said finger, and two metallic points with which the said lever is adapted to make and break electrical connection as the finger piece is pressed against the spring or released, substantially as described.

9. In a weighing and package filling machine, the combination of a gate, a solenoid whose core is connected with the gate, a source of electrical supply connected with the solenoid, a pivoted lever carrying at one end a striking point in line with the core of the solenoid, and having at its other end a contact piece, two contact points which are connected by the contact piece and form a part of the circuit, the lever being so adjusted that when a current of electricity is passed through the solenoid the core will be drawn against the striking point and turn the lever on its pivot, lifting the contact piece and breaking the circuit, substantially as described.

10. In a weighing and package filling machine, the combination with a hopper, a weighing scale and a gate controlling the outlet of the hopper, of a double solenoid having its cores connected with the gate, a contact piece on the scale beam, two terminal pieces adapted to be electrically connected by the contact piece when the scale beam tips, suitable wires connected with said terminals and solenoids and a source of electrical supply whereby the circuit is completed by the tipping of the scale beam and the cores of the solenoids move in a direction to close the gate, the circuit being broken by the falling of the scale beam when the package is removed, a spring controlled lever $f^2$ which is connected with the scale platform and which carries a contact piece forming part of the circuit through the second solenoid and which is adapted to be moved so as to complete the circuit by the placing of a box on the scale platform, thereby causing the core to move and open the gate, a pivoted lever $v$ carrying at one end a striking point in line with said second solenoid and having at its other end a contact piece, two contact points which together with the contact piece form a part of the circuit, the lever $v$ being so adjusted that when the core is moved to open the gate it will be thrust against the striking point and tip the lever and break the circuit and will fall back and close the circuit at that point when the core is withdrawn, and a secondary fulcrum $x$ for the lever $f^2$ whereby the circuit is broken at another point when the scale beam begins to tip and before the circuit is re-established through the first solenoid, and a feeder which is connected by a clutch with driving mechanism, the clutch being connected with the core of the solenoid in such a manner as to have the feeder operate only while the gate is open, substantially as described.

WILLIAM H. DOBLE.
EDWARD H. DEWSON, Jr.

Witnesses:
W. A. COPELAND,
A. I. CRAWFORD.